(12) United States Patent
Nam et al.

(10) Patent No.: US 10,952,196 B2
(45) Date of Patent: Mar. 16, 2021

(54) DMRS INDICATION FOR TRANSMISSIONS SCHEDULED BY FALLBACK DCI IN NR

(71) Applicant: QUALCOMM Incorporated, San Diego, CA (US)

(72) Inventors: Wooseok Nam, San Diego, CA (US); Tao Luo, San Diego, CA (US); Alexandros Manolakos, San Diego, CA (US); Wanshi Chen, San Diego, CA (US); Peter Gaal, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,420

(22) Filed: Feb. 7, 2019

(65) Prior Publication Data
US 2019/0261324 A1 Aug. 22, 2019

Related U.S. Application Data

(60) Provisional application No. 62/710,572, filed on Feb. 16, 2018.

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0048* (2013.01); *H04L 5/0051* (2013.01); *H04L 5/0023* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 2015/0003316 A1* | 1/2015 | Kim | H04L 5/0055 370/312 |
| 2015/0003352 A1 | 1/2015 | Seo et al. | |
| 2015/0282192 A1* | 10/2015 | Shin | H04W 72/082 370/329 |

OTHER PUBLICATIONS

CATT: "Remaining Details of PDCCH Structure", 3GPP Draft; R1-1720190, 3rd Generation Partnership Project (3GPP), Mobile Competence Centre, 650, Route Des Lucioles; F-06921 Sophia-Antipolis Cedex, France, vol. RAN WG1,No. Reno, USA; Nov. 27, 2017-Dec. 1, 2017, Nov. 18, 2017 (Nov. 18, 2017), 3 Pages, XP051369826, Retrieved from the Internet: URL: http://www.3gpp.org/ftp/tsg_ran/WG1_RL1/TSGR1_91/Docs/ [retrieved on Nov. 18, 2017], DMRS Sequence Generation; p. 1, Paragraph 2.1—p. 2.

(Continued)

*Primary Examiner* — Yaotang Wang

(57) ABSTRACT

Aspects of the disclosure relate to a configurable demodulation reference signal (DMRS) when utilizing a fallback downlink control information (DCI) format that lacks DMRS antenna port information or DMRS sequence initialization information. The DMRS configuration may be identified based on one or more semi-static and/or dynamic parameters, such as a cell identifier, cell radio network temporary identifier, DMRS scrambling identifier, subframe number and/or slot index.

31 Claims, 13 Drawing Sheets

(56) References Cited

OTHER PUBLICATIONS

Ericsson: "Summary of 7.31 a (DCI Contents and Formats)", 3GPP Draft; R1-1801012 Summary of 7.3.1.4 (DCI Content), 3rd Generation Partnership Project (3GPP), Mobile Competence Centre, 650, Route Des Lucioles; F-06921 Sophia-Antipolis Cedex, France, vol. RAN WG1,No. Vancouver, Canada; Jan. 22, 2018-Jan. 26, 2018, Jan. 23, 2018 (Jan. 23, 2018), 11 Pages, XP051385251, Retrieved from the Internet: URL: http://www.3gpp.org/ftp/tsg_ran/WG1_RL1/TSGR1_91/Docs/ [retrieved on Jan. 23, 2018], Default values; p. 1, Paragraph 5—p. 2.

International Search Report and Written Opinion—PCT/US2019/017365—ISA/EPO—dated Apr. 11, 2019.

OPPO: "Remaining Issues on MIMO Related DCI Design", 3GPP Draft; R1-1802097, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 15, 2018 (Feb. 15, 2018), 2 Pages, XP051396829, Retrieved from the Internet: URL: http://www.3gpp.org/ftp/tsg_ran/WG1_RL1/TSGR1_92/Docs/ [retrieved on Feb. 15, 2018], Discussion; p. 1, Paragraph 2—p. 2.

Spreadtrum Communications: "Remaining Issues on DMRS", 3GPP Drafts; R1-1801833 Remaining Issues on DMRS_Final, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 15, 2018 (Feb. 15, 2018), 8 Pages, XP051396884, Retrieved from the Internet: URL: http://www.3gpp.org/ftp/tsg_ran/WG1_RL1/TSGR1_92/Docs/ [retrieved on Feb. 15, 2018], Introduction; p. 1, Paragraph 1, Scrambling ID; p. 4, Paragraph 2.4.

* cited by examiner

DMRS INDICATION FOR TRANSMISSIONS SCHEDULED BY FALLBACK DCI IN NR

PRIORITY CLAIM

This application claims priority to and the benefit of Provisional Patent Application No. 62/710,572 filed in the U.S. Patent and Trademark Office on Feb. 16, 2018, the entire content of which is incorporated herein by reference as if fully set forth below in its entirety and for all applicable purposes.

TECHNICAL FIELD

The technology discussed below relates generally to wireless communication systems, and more particularly, to scheduling of reference signals utilized in wireless communication systems.

INTRODUCTION

Wireless transmissions between a base station and one or more user equipment (UE) within a cell are generally scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via downlink control information (DCI) in a physical downlink control channel (PDCCH). For example, the DCI may include scheduling information for traffic, control information, and/or pilot or reference signals transmitted between the base station and UEs.

One example of a reference signal that may be scheduled via DCI includes the demodulation reference signal (DMRS). The DMRS may be utilized by a receiver for channel estimation of the corresponding channel, which may enable coherent demodulation/detection of received control and/or traffic. In some DCI formats (e.g., a default or fallback DCI format), only a minimum set of information is provided for scheduling the DMRS. As a result, a UE may not be able to discern the DMRS configuration from the DCI and other higher-layer (e.g., radio resource control (RRC)) parameters. Therefore, in some examples, a fixed DMRS configuration may be provided when utilizing a fallback DCI format. However, for unicast transmissions and some broadcast transmissions, a fixed DMRS configuration may result in collisions between neighboring cells, thus increasing interference in the cell. In addition, a fixed DMRS configuration may limit the flexibility for spatial multiplexing with orthogonal multi-user multiple-input multiple-output (MU-MIMO).

As the demand for mobile broadband access continues to increase, research and development continue to advance scheduling of reference signals in wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to a configurable demodulation reference signal (DMRS) when utilizing a fallback downlink control information (DCI) format that lacks DMRS antenna port information or DMRS sequence initialization information. The DMRS configuration may be identified based on one or more semi-static and/or dynamic parameters, such as a cell identifier, cell radio network temporary identifier, DMRS scrambling identifier, subframe number, and/or slot index. The configurable DMRS may be implemented for unicast or broadcast transmissions.

In one aspect of the disclosure, a method of wireless communication in a wireless communication network for a scheduled entity to communicate with a scheduling entity is provided. The method includes receiving downlink control information (DCI) including a DCI format, where the DCI format includes scheduling information that lacks at least a portion of demodulation reference signal (DMRS) scheduling information for a DMRS. The method further includes determining one or more parameters including at least one of semi-static parameters or dynamic parameters and identifying a DMRS configuration of the DMRS, in which the DMRS configuration includes at least antenna port information and DMRS sequence initialization information identified based on the one or more parameters. The method further includes communicating the DMRS associated with an uplink transmission or a downlink transmission between the scheduled entity and the scheduling entity using the DMRS configuration.

Another aspect of the disclosure provides a scheduled entity in a wireless communication network. The scheduled entity includes a transceiver configured to wirelessly communicate with a scheduling entity, a memory, and a processor communicatively coupled to the transceiver and the memory. The processor is configured to receive downlink control information (DCI) including a DCI format via the transceiver, in which the DCI format includes scheduling information that lacks at least a portion of demodulation reference signal (DMRS) scheduling information for a DMRS. The processor is further configured to determine one or more parameters including at least one of semi-static parameters or dynamic parameters and identify a DMRS configuration of the DMRS, in which the DMRS configuration includes at least antenna port information and DMRS sequence initialization information identified based on the one or more parameters. The processor is further configured to communicate the DMRS associated with an uplink transmission or a downlink transmission between the scheduled entity and the scheduling entity using the DMRS configuration.

Another aspect of the disclosure provides a scheduled entity apparatus for wireless communication. The scheduled entity apparatus includes means for receiving downlink control information (DCI) including a DCI format from a scheduling entity, in which the DCI format includes scheduling information that lacks at least a portion of demodulation reference signal (DMRS) scheduling information for a DMRS. The scheduled entity apparatus further includes means for determining one or more parameters including at least one of semi-static parameters or dynamic parameters and means for identifying a DMRS configuration of the DMRS, in which the DMRS configuration includes at least antenna port information and DMRS sequence initialization information identified based on the one or more parameters. The scheduled entity apparatus further includes means for communicating the DMRS associated with an uplink transmission or a downlink transmission between the scheduled entity and the scheduling entity using the DMRS configuration.

Another aspect of the disclosure provides a non-transitory computer-readable medium storing computer-executable code, including code for causing a scheduled entity in a wireless communication network to receive downlink control information (DCI) including a DCI format from a scheduling entity, in which the DCI format includes scheduling information that lacks at least a portion of demodulation reference signal (DMRS) scheduling information for a DMRS. The non-transitory computer-readable medium further includes code for causing the scheduled entity to determine one or more parameters including at least one of semi-static parameters or dynamic parameters and identify a DMRS configuration of the DMRS, in which the DMRS configuration includes at least antenna port information and DMRS sequence initialization information identified based on the one or more parameters. The non-transitory computer-readable medium further includes code for causing the scheduled entity to communicate the DMRS associated with an uplink transmission or a downlink transmission between the scheduled entity and the scheduling entity using the DMRS configuration.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
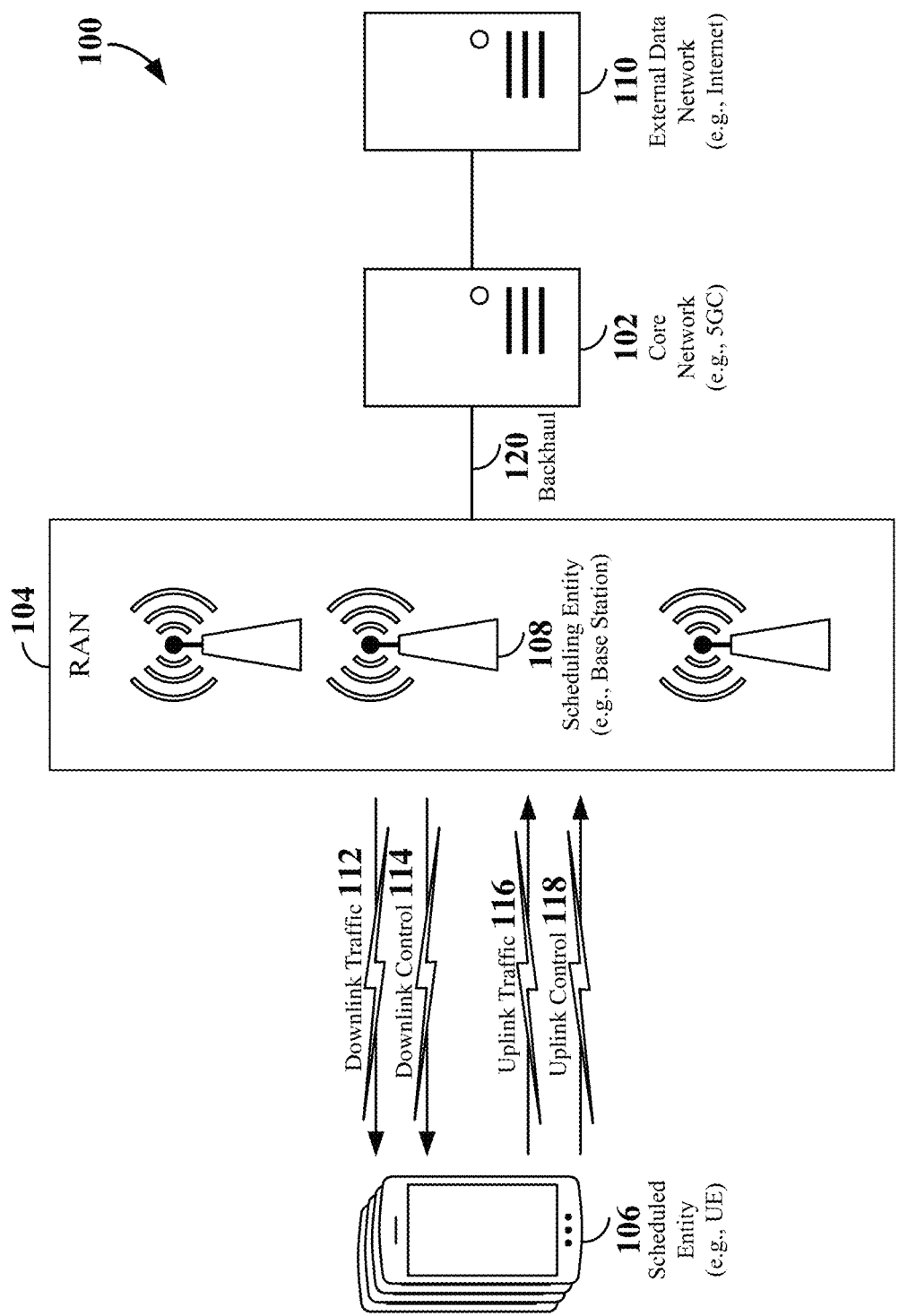
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
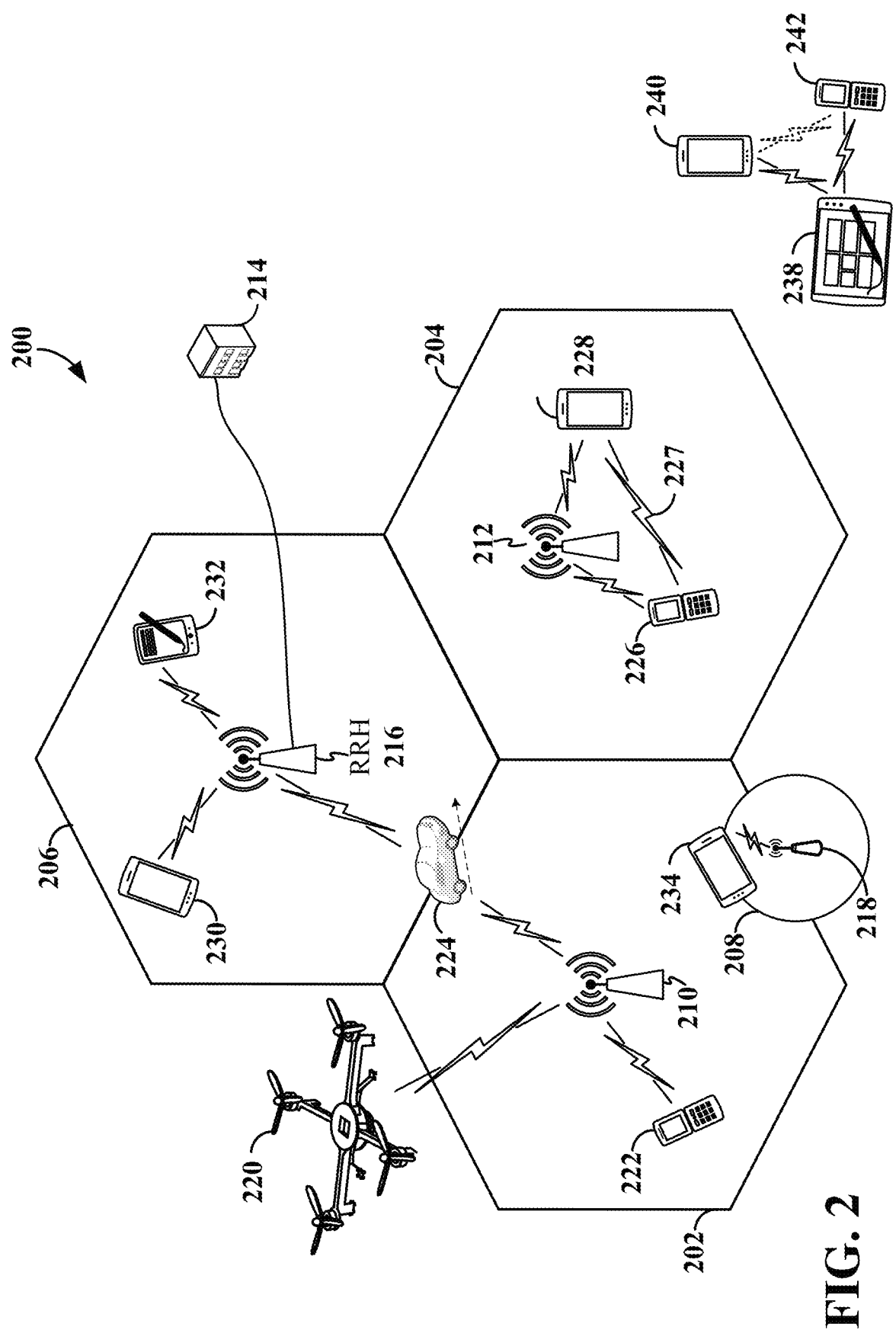
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
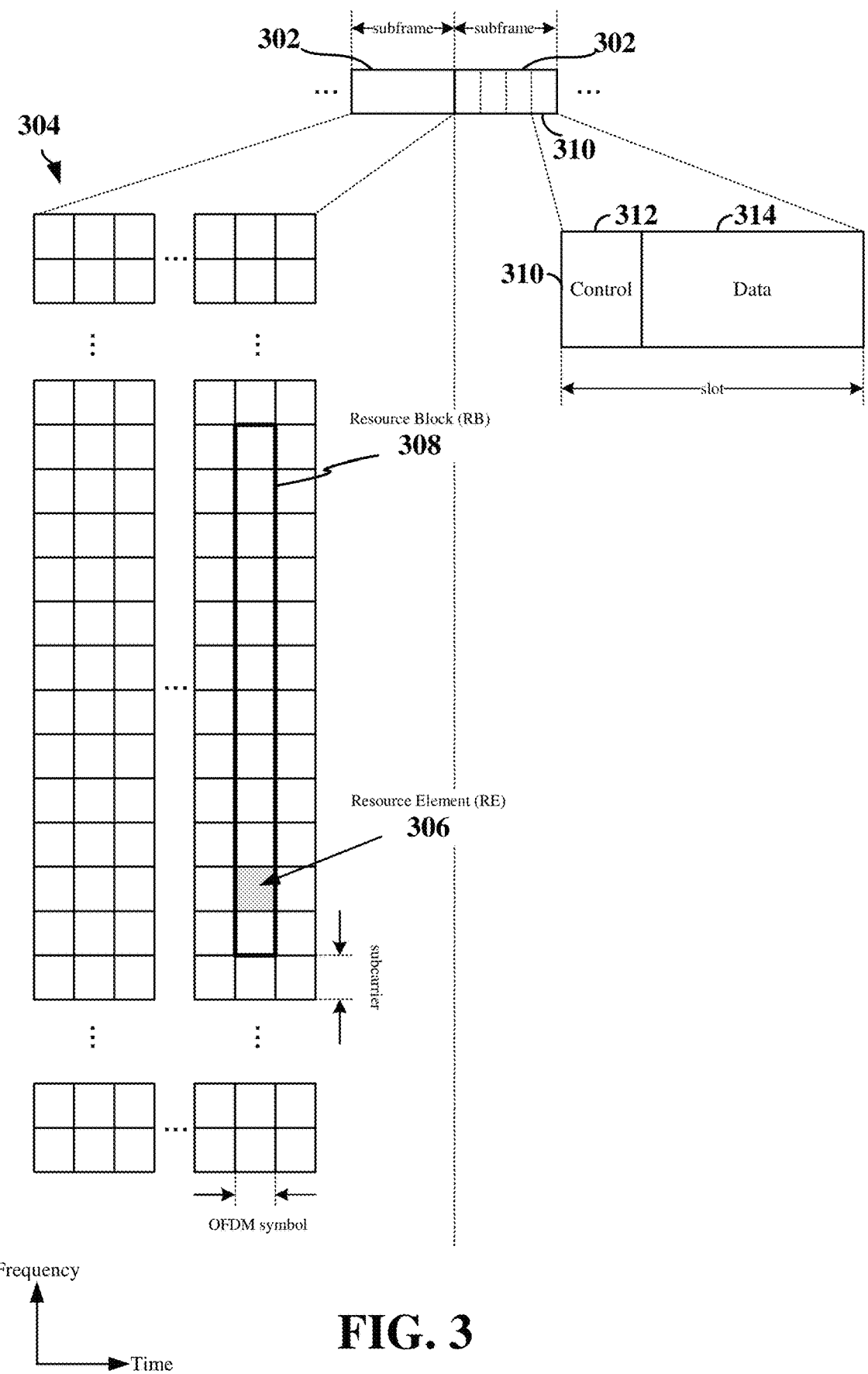
FIG. 3 is a diagram illustrating an example of a frame structure for use in a radio access network.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a cell-specific reference signal (CRS), or a sounding reference signal (SRS). These pilots or reference signals may provide for a receiving device to perform channel estimation and/or assessment of the corresponding channel, which may enable coherent demodulation/detection of the control and/or data channels within the RB 308.

In a DL transmission, the transmitting device may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
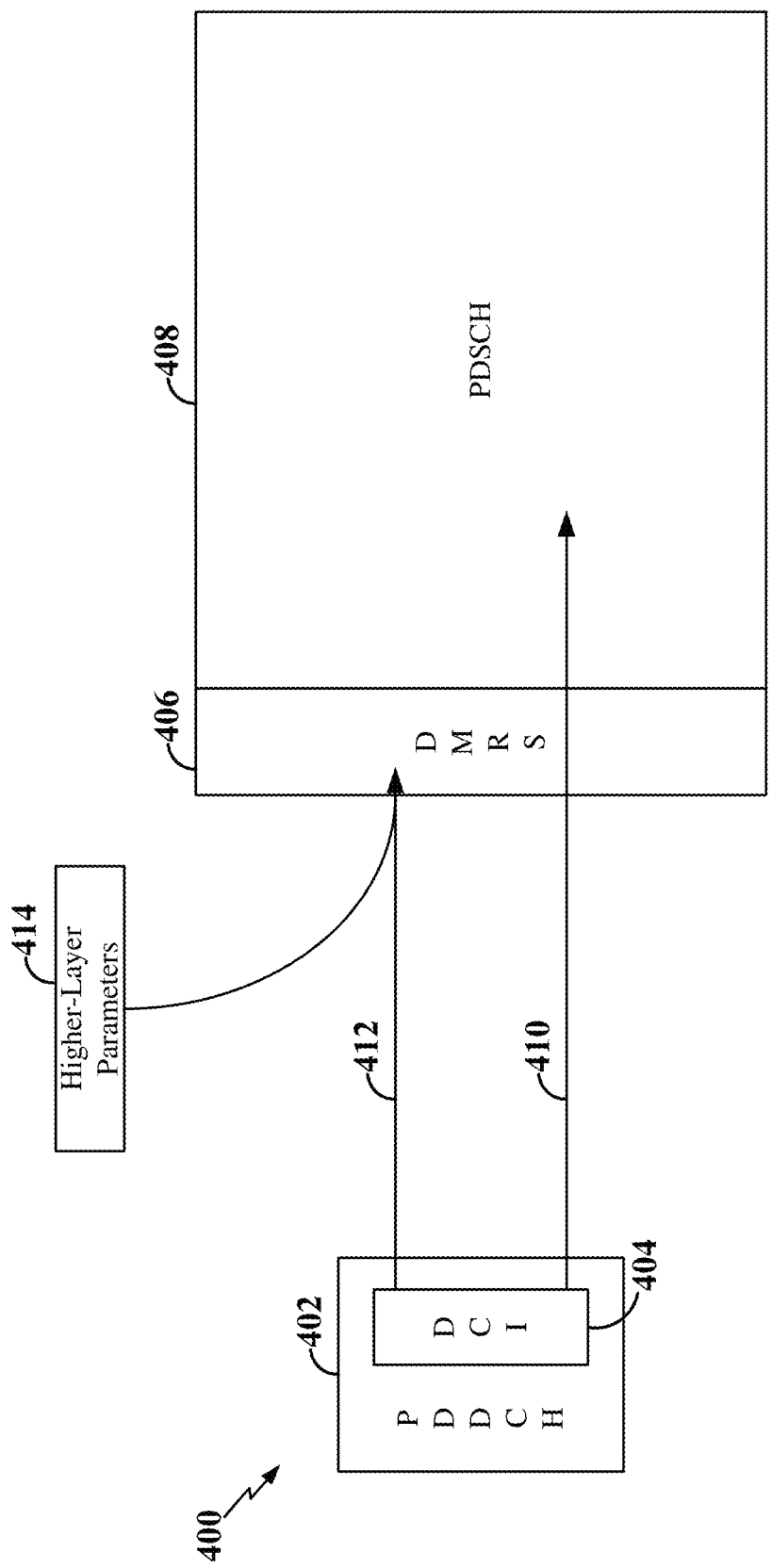
FIG. 4 is a diagram illustrating an example of a slot including a demodulation reference signal (DMRS) configured in accordance with downlink control information (DCI).

FIG. 4 is a diagram illustrating an example of a transmission 400 including a demodulation reference signal (DMRS) 406 configured in accordance with downlink control information (DCI) 404 contained within a physical downlink control channel (PDCCH) 402. In some examples, the transmission 400 may include a single slot or may be distributed across two or more slots.

In New Radio (NR) networks, the DMRS 406 may be transmitted on the downlink or uplink to assist with channel estimation and enable coherent demodulation/detection of subsequently received control and/or data channels. For example, the DMRS 406 may transmitted prior to and/or during a PUSCH or a PDSCH 408, the latter being illustrated in FIG. 4. The DCI 404 may be transmitted within the PDCCH 402 of the slot, and may include scheduling information 410 for an uplink transmission (PUSCH) or a downlink transmission (PDSCH) 408, the latter being illustrated in FIG. 4. The scheduling information 410 may indicate, for example, the resource block(s) allocated for the PDSCH 408, index of the first OFDM symbol of the PDSCH 408, number of OFDM symbols of the PDSCH 408, the modulation and coding scheme (MCS) to utilize for the PDSCH 408, and other information.

Depending on the DCI format, the DCI 404 may further include DMRS scheduling information 412 that, together with various higher-layer (e.g., radio resource control (RRC)) parameters 414, may indicate a configuration of the DMRS 406 transmitted prior to and/or during the PDSCH 408. Examples of higher-layer parameters 414 may include, but are not limited to, a DMRS configuration type, a DMRS maximum length, and a DMRS scrambling identifier. The DMRS scheduling information 412 within the DCI 404 may include, for example, antenna port information indicating DMRS port mapping, and may further include DMRS sequence initialization information indicating the index of the DMRS scrambling identifier for DMRS sequence generation. The DMRS sequence initialization information may be, for example, a one bit field within the DCI 404.

The antenna port information may be, for example, a four, five, or six bit field within the DCI 404, depending on the number of rows within a DMRS port mapping table utilized by the UE. The antenna port information may designate the particular row within the DMRS port mapping table to utilize for the DMRS 406. Each row in the DMRS port mapping table may define the number of DMRS ports and the DMRS port index to use for each DMRS port. In some examples, the DMRS port mapping table may include sixteen, thirty-two, or sixty-four rows.

Figure 5:
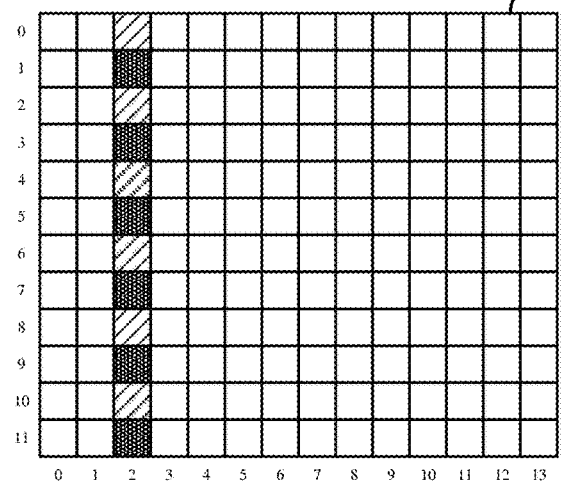
FIG. 5 is a diagram illustrating an example of DMRS port mapping for a single DMRS symbol.
Figure 5:
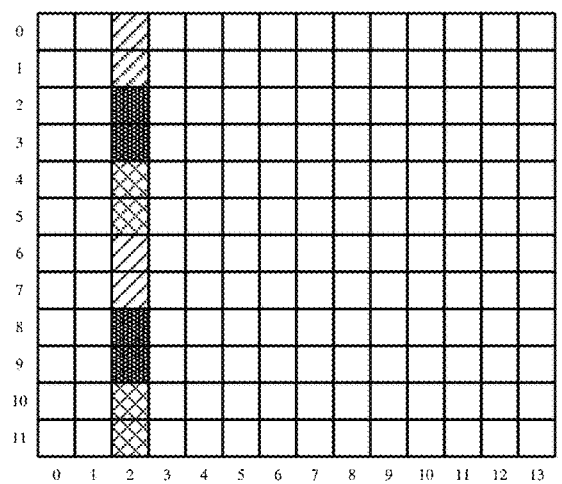
Figure 5:
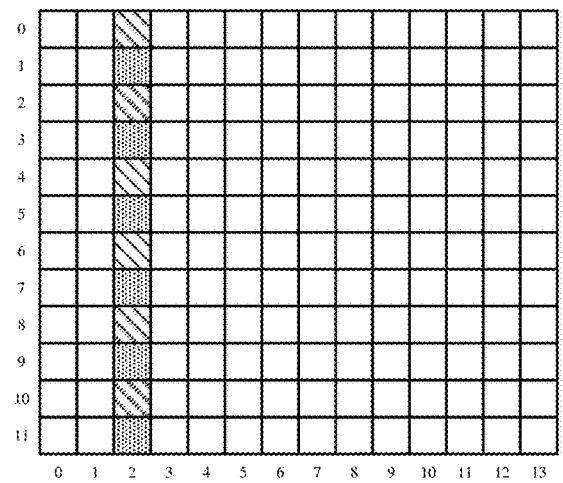
Figure 5:
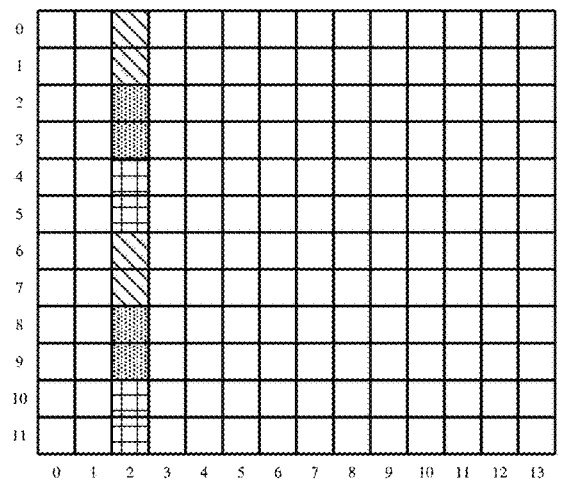

FIG. 5 is a diagram illustrating an example of DMRS port mapping 500 for a single DMRS symbol. The DMRS port mapping 500 shown in FIG. 5 may be utilized, for example, to map antenna ports (e.g., Ports 1000-1005) to resource elements (REs) 502 based on a selected row of a DMRS port mapping table (not shown) maintained at (stored within) the base station and the UE. In the example shown in FIG. 5, both DMRS configuration type 1 (Config Type 1) with four antenna ports (Ports 1000, 1001, 1002, and 1003) and DMRS configuration type 2 (Config Type 2) with six antenna ports (Ports 1000, 1001, 1002, 1003, 1004, and 1005) are illustrated. In each DMRS configuration type, the starting position of the DMRS may be within OFDM symbol two or three, the former being illustrated. Each antenna port may be mapped to one or more resource elements (REs) 502, as shown in FIG. 5. In addition, each DMRS configuration type (Config Type 1 and Config Type 2) may be maintained at (stored within) the base station and the UE.

The selected row of the DMRS port mapping table (not shown) may indicate, for example, which antenna ports (e.g., Ports 1000-1005) to utilize in one of the DMRS configuration types for a particular DMRS. For example, a particular selected row of the DMRS port mapping table may indicate that antenna ports 1000, 1001, and 1002, each associated with a corresponding DMRS scrambling identifier index as indicated by the DMRS sequence initialization information, should be utilized in Config Type 1 (as indicated by higher-layer parameters) for a DMRS. In this example, antenna ports 1000 and 1001 may be mapped to the same REs 502, while antenna port 1002 may be mapped to different REs 502 within the same OFDM symbol.

In some fallback (default) DCI formats, at least a portion of the DMRS scheduling information (e.g., the antenna port information indicating the specific antenna ports to utilize and/or the DMRS sequence initialization information indicating the associated DMRS scrambling identifier index to utilize for each antenna port) is not included. For example, DCI Format 1_0 and/or 0_0 may include only a minimum set of information for scheduling. When such a fallback DCI format is utilized, the UE may not be able to determine the DMRS port mapping from the higher-layer parameters alone. In some examples, a fixed DMRS sequence and RE mapping may be utilized. For example, if a broadcast PDSCH is scheduled by a PDCCH including a cyclic redundancy check (CRC) scrambled by a system information radio network temporary identifier (SI-RNTI), random access RNTI (RA-RNTI), paging RNTI (P-RNTI) and/or temporary cell RNTI (TC-RNTI), a fallback DCI format may be used and a fixed DMRS sequence and RE mapping may be configured in the radio access network.

However, for unicast transmissions (e.g., PDCCH with CRC scrambled by cell RNTI (C-RNTI)) and some broadcast transmissions (e.g., remaining minimum system information (RMSI), OSI, and/or paging), a fallback DCI format with a corresponding fixed DMRS configuration for the corresponding PDSCH/PUSCH may not be adequate. In some examples, a fixed DMRS configuration for unicast and broadcast transmission may result in collisions between neighboring cells, thus increasing interference in the cell. In addition, utilizing a fixed DMRS configuration limits the flexibility for spatial multiplexing of multiple PDSCH/PUSCH with orthogonal multi-user MIMO.

Figure 6:
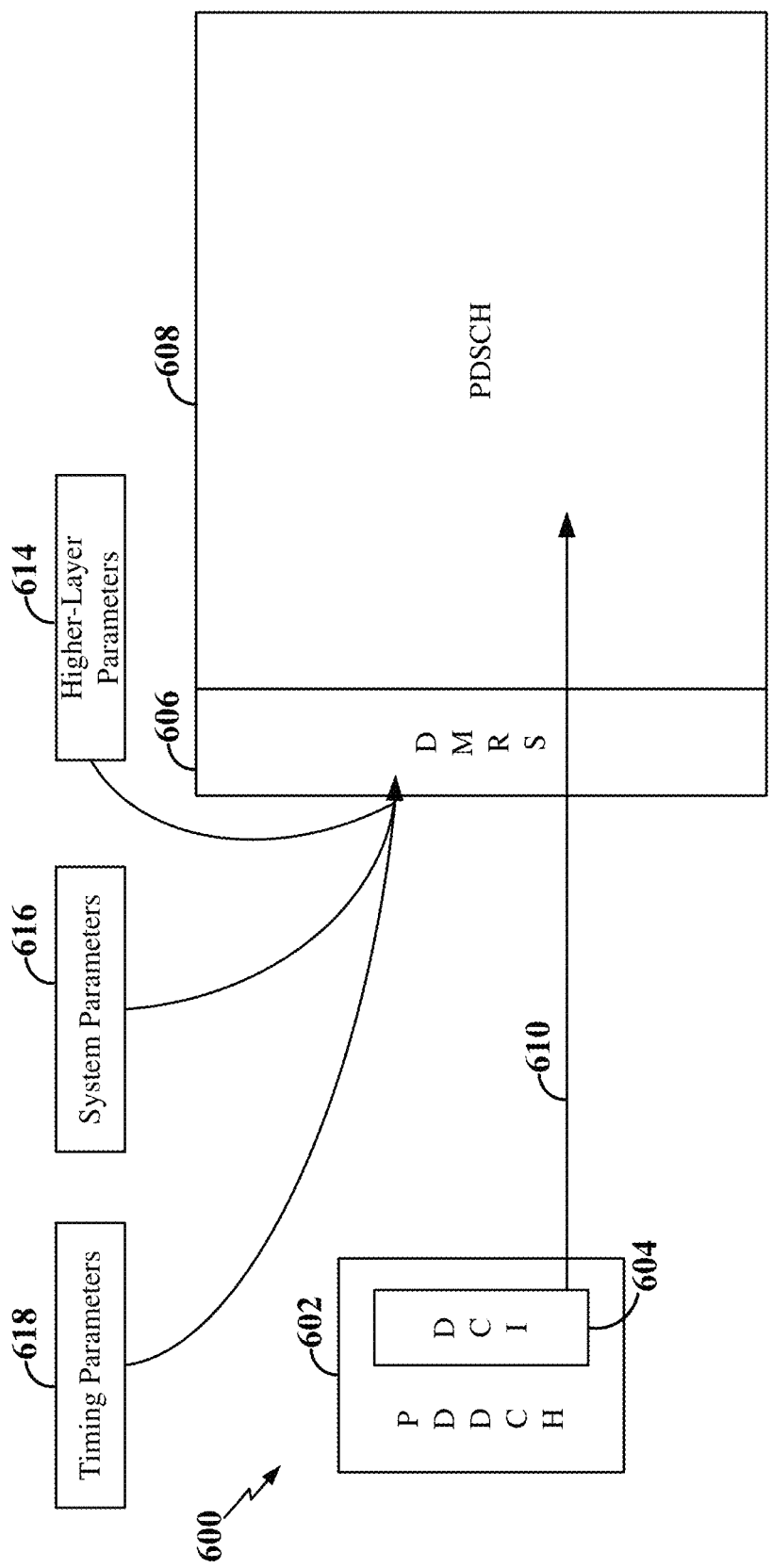
FIG. 6 is a diagram illustrating an example of a slot including a DMRS configured in accordance with one or more parameters according to some aspects of the disclosure.

FIG. 6 is a diagram illustrating an example of a transmission 600 including a DMRS 606 configured in accordance with one or more parameters according to some aspects of the disclosure. In some examples, the transmission 600 may include a single slot or may be distributed across two or more slots. In the example shown in FIG. 6, a fallback DCI format is utilized, and thus, no DMRS scheduling information is included within the DCI 604 of the PDCCH 602. However, the DCI 604 may still include scheduling information 610 for an uplink transmission (PUSCH) or a downlink transmission (PDSCH) 608, the latter being illustrated in FIG. 6.

In order to provide a configurable (instead of fixed) DMRS 606 for a PDSCH 608 (or PUSCH), the DMRS configuration may be identified utilizing one or more semi-static and/or dynamic parameters (e.g., system parameters 616 and/or timing parameters 618), along with the other higher-layer parameters 614 indicated above (e.g., DMRS configuration type, DMRS maximum length, DMRS scrambling identifier, etc.). In some examples, the DMRS configuration to utilize for a unicast or broadcast transmission may be directly indicated via semi-static radio resource control (RRC) signaling. In other examples, the DMRS configuration may be implicitly determined based on the values of various semi-static and/or dynamic parameters including, for example, various system parameters 616 (e.g., cell identifier (Cell-ID), C-RNTI, DMRS scrambling identifier, etc.) and/or time parameters 618 (e.g., subframe number (SFN), slot index within which the DMRS and/or PDSCH/PUSCH is scheduled, etc.).

In some examples, the antenna port information may be identified based on a modular of the DMRS scrambling identifier. For example, the antenna port information may be calculated as: $N_{ID}^{nSCID}$ mod X, where $N_{ID}^{nSCID} \in \{0, 1, \ldots, 65535\}$ is the higher-layer DMRS scrambling identifier and X depends on the DMRS configuration (e.g., DMRS configuration type and/or DMRS maximum length). In some examples, X is sixteen, thirty-two, or sixty-four, depending on the number of rows in the DMRS port mapping table utilized by the UE (scheduled entity) and base station (scheduling entity). In some examples, the cell identifier may be utilized instead of the DMRS scrambling identifier (e.g., when the DMRS scrambling identifier is not configured). In this example, the antenna port information may be calculated as: $N_{ID}^{nCID}$ mod X, where $N_{ID}^{nCID}$ is the cell identifier.

In other examples, the antenna port information may be identified based on a modular of the DMRS scrambling identifier and the slot index (slot number in the radio frame within which the DMRS is transmitted). For example, the antenna port information may be calculated as: $(N_{ID}^{nSCID} + n_s)$ mod X, where $n_s$ is the slot index and X depends on the DMRS configuration (e.g., DMRS configuration type and/or DMRS maximum length). In some examples, X is sixteen, thirty-two, or sixty-four, depending on the number of rows in the DMRS port mapping table utilized by the UE (scheduled entity) and base station (scheduling entity).

In some examples, the DMRS sequence initialization information may be fixed (e.g., $n_{SCID}=0$ or $n_{SCID}=1$). In other examples, the DMRS sequence initialization information may be identified based on a modular of the slot index. For example, the DMRS sequence initialization information may be calculated as $n_{SCID}=n_s$ mod 2.

Figure 7:
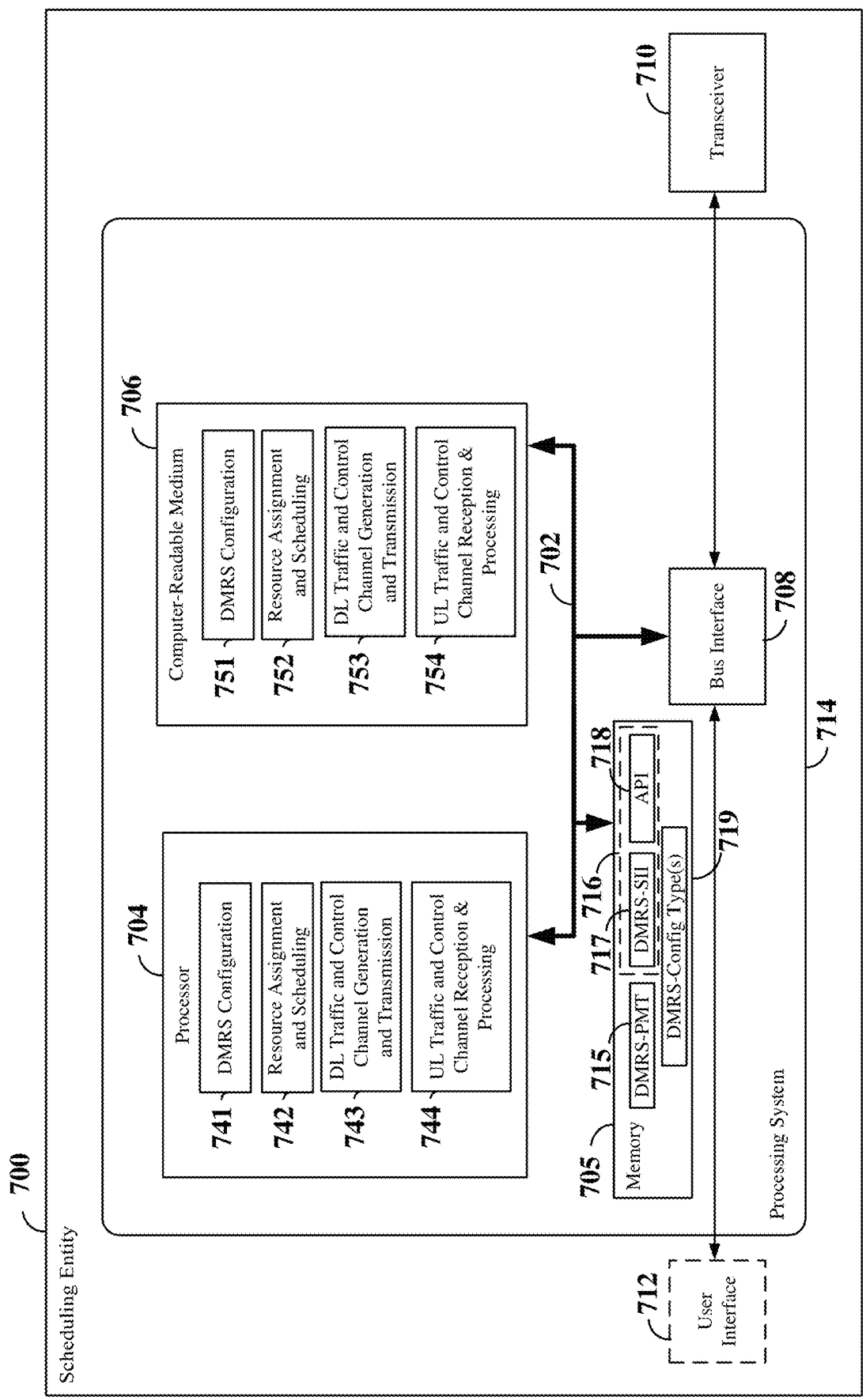
FIG. 7 is a block diagram conceptually illustrating an example of a hardware implementation for a scheduling entity according to some aspects of the disclosure.

FIG. 7 is a block diagram illustrating an example of a hardware implementation for a scheduling entity 700 employing a processing system 714. For example, the scheduling entity 700 may be a base station as illustrated in any one or more of FIGS. 1 and/or 2.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

The processor 704 is responsible for managing the bus 702 and general processing, including the execution of software that may be stored on the computer-readable medium 706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 704, causes the processing system 714 to perform the various functions described below for any particular apparatus. The computer-readable medium 706 and the memory 705 may also be used for storing data that is manipulated by the processor 704 when executing software.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include DMRS configuration circuitry 741, configured to identify a DMRS configuration 716 of a particular DMRS to be communicated between the scheduling entity and a set of one or more scheduled entities associated with an uplink transmission (e.g., PUSCH) or a downlink transmission (e.g., PDSCH). In various aspects of the disclosure, the DMRS configuration circuitry 741 may be configured to identify the DMRS configuration type, DMRS maximum length, DMRS scrambling identifier, antenna port information, and DMRS sequence initialization information for a DMRS. When a fallback DCI format is utilized for a PDCCH, the DMRS configuration circuitry 741 may identify the antenna port information (API) 717 and DMRS sequence initialization information (DMRS-SII) 718 of the DMRS configuration 716 based on one or more parameters.

In some examples, the API 717 and/or DMRS-SII 718 may be selected by the DMRS configuration circuitry 741 and directly indicated to the set of one or more scheduled entities via semi-static radio resource control (RRC) signaling. In other examples, the API 717 and/or DMRS-SII 718 may be implicitly determined by the DMRS configuration circuitry 741 based on the values of various other semi-static and/or dynamic parameters including, for example, various system parameters (e.g., cell identifier (Cell-ID), C-RNTI, DMRS scrambling identifier, etc.) and/or time parameters (e.g., subframe number (SFN), slot index within which the DMRS and/or PDSCH/PUSCH is scheduled, etc.).

The DMRS configuration circuitry 741 may further utilize a DMRS port mapping table (DMRS-PMT) 715 maintained, for example, in memory 705, to identify the antenna ports and associated DMRS scrambling identifier indexes for the DMRS based on the row within the DMRS-PMT 715 designated by the API 717. The selected row in the DMRS-PMT 715 may then be utilized by the DMRS configuration circuitry 741 to discern the antenna port to resource element (RE) mapping for the DMRS based on a selected one of a plurality of DMRS configuration types (DMRS-Config Type(s)) 719 maintained, for example, in memory 705. In some examples, the selected DMRS-Config Type 719 may correspond to one of the configuration types (Config Type 1 or Config Type 2) shown in FIG. 5. The selected DMRS-Config Type 719 may further be transmitted to the UE via higher-layer (e.g., RRC) signaling. The identified DMRS configuration 716 for the DMRS, including the API 717 and DMRS-SII 718, may be maintained in memory 705 during generation and transmission of the DCI and higher-layer parameters related to the DMRS, and during generation/transmission and/or reception of the DMRS.

In some examples, the DMRS-PMT 715 may include more than one DMRS-PMT 715. For example, a first DMRS-PMT may be utilized when DCI having a fallback DCI format is transmitted, while a second DMRS-PMT may be utilized when DCI having a non-fallback DCI format is transmitted. The DMRS configuration circuitry 741 may further be configured to execute DMRS configuration software 751 included on the computer-readable medium 706 to implement one or more functions described herein.

The processor 704 may further include resource assignment and scheduling circuitry 742, configured to generate, schedule, and modify a resource assignment or grant of time-frequency resources (e.g., a set of one or more resource elements). For example, the resource assignment and scheduling circuitry 342 may schedule time-frequency resources within a plurality of time division duplex (TDD) or frequency division duplex (FDD) radio frames, subframes, and/or slots to carry traffic, control information, and/or pilots or reference signals (e.g., DMRS) to and/or from multiple scheduled entities. The resource assignment and scheduling circuitry 742 may further be configured to execute resource assignment and scheduling software 752 included on the computer-readable medium 706 to implement one or more functions described herein.

The processor 704 may further include downlink (DL) traffic and control channel generation and transmission circuitry 743, configured to generate and transmit downlink traffic and control channels within one or more radio frames, subframes and/or slots. The DL traffic and control channel generation and transmission circuitry 743 may operate in coordination with the resource assignment and scheduling circuitry 742 to place the DL traffic and/or control information onto a plurality of time division duplex (TDD) or frequency division duplex (FDD) carriers in accordance with the resources assigned to the DL traffic, DL control information (e.g., DCI within a PDCCH), and/or pilots or reference signals (e.g., DMRS). For example, the DL traffic and control channel generation and transmission circuitry 743 may be configured to generate and transmit a DMRS based on the DMRS configuration 716 indicated by the DCI, higher-layer parameters, and other semi-static and/or dynamic parameters related to the DMRS configuration, as described herein. The DL traffic and control channel generation and transmission circuitry 743 may further be configured to execute DL traffic and control channel generation and transmission software 753 included on the computer-readable medium to implement one or more functions described herein.

The processor 704 may further include uplink (UL) traffic and control channel reception and processing circuitry 744, configured to receive and process uplink control channels and uplink traffic channels from one or more scheduled entities. For example, the UL traffic and control channel reception and processing circuitry 744 may be configured to receive uplink traffic from one or more scheduled entities. The UL traffic and control channel reception and processing circuitry 744 may further be configured to receive UL control information or reference signals (e.g., DMRS) from a scheduled entity. For example, the UL traffic and control channel reception and processing circuitry 744 may be configured to receive a DMRS based on the DMRS configuration 716 indicated by the DCI, higher-layer parameters, and other semi-static and/or dynamic parameters related to the DMRS configuration, as described herein. In general, the UL traffic and control channel reception and processing circuitry 744 may operate in coordination with the resource assignment and scheduling circuitry 742 to schedule UL traffic transmissions, DL traffic transmissions and/or DL traffic retransmissions in accordance with received UL control information. The UL traffic and control channel reception and processing circuitry 744 may further be configured to execute UL traffic and control channel reception and processing software 754 included on the computer-readable medium 706 to implement one or more of the functions described herein.

Figure 8:
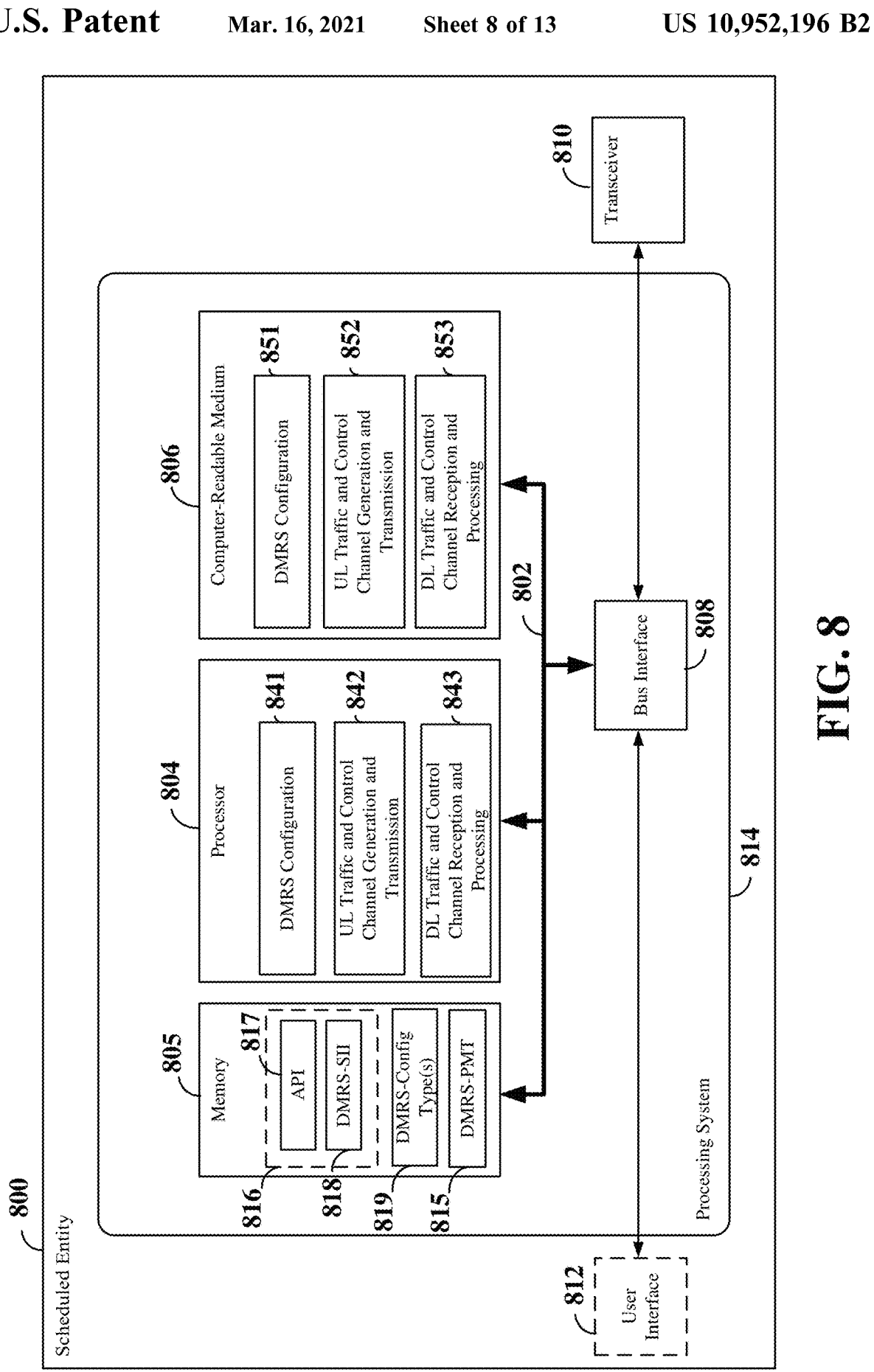
FIG. 8 is a block diagram conceptually illustrating an example of a hardware implementation for a scheduled entity according to some aspects of the disclosure.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1 and/or 2.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be used to implement any one or more of the processes described below.

In some aspects of the disclosure, the processor 804 may include DMRS configuration circuitry 841, configured to identify a DMRS configuration 816 of a DMRS to be communicated between the scheduled entity 800 and a scheduling entity associated with an uplink transmission (e.g., PUSCH) or a downlink transmission (e.g., PDSCH). In various aspects of the disclosure, the DMRS configuration circuitry 841 may be configured to identify the DMRS configuration type, DMRS maximum length, DMRS scrambling identifier, antenna port information, and DMRS sequence initialization information for a DMRS. When a fallback DCI format is utilized for a PDCCH, the DMRS configuration circuitry 841 may identify the antenna port information (API) 817 and DMRS sequence initialization information (DMRS-SII) 818 of the DMRS configuration 816 based on one or more parameters that may be determined by the DMRS configuration circuitry 841 or other circuitry within the scheduled entity 800.

In some examples, the API 817 and/or DMRS-SII 818 may be directly identified by the DMRS configuration circuitry 841 based on semi-static radio resource control (RRC) signaling received from the scheduling entity. In other examples, the API 817 and/or DMRS-SII 818 may be implicitly determined by the DMRS configuration circuitry 841 based on the values of various semi-static and/or dynamic parameters including, for example, various system parameters (e.g., cell identifier (Cell-ID), C-RNTI, DMRS scrambling identifier, etc.) and/or time parameters (e.g., subframe number (SFN), slot index within which the DMRS and/or PDSCH/PUSCH is scheduled, etc.).

The DMRS configuration circuitry 841 may further utilize a DMRS port mapping table (DMRS-PMT) 815 maintained, for example, in memory 805, to identify the antenna ports and associated DMRS scrambling identifier indexes for the DMRS based on the row within the DMRS-PMT 815 designated by the API 817. The selected row in the DMRS-PMT 815 may then be utilized by the DMRS configuration circuitry 841 to discern the antenna port to resource element (RE) mapping for the DMRS based on a selected one of a plurality of DMRS configuration types (DMRS-Config Type(s)) 819 maintained, for example, in memory 705. In some examples, the selected DMRS-Config Type 819 may correspond to one of the configuration types (Config Type 1 or Config Type 2) shown in FIG. 5. The selected DMRS-Config Type 819 may further be received by the scheduled entity 800 from the scheduling entity via higher-layer (e.g., RRC) signaling. The identified DMRS configuration 816 for the DMRS, including the API 817 and DMRS-SII 818, may be maintained in memory 805 during generation/transmission and/or reception of the DMRS.

In some examples, the DMRS port mapping table 815 may include more than one mapping table. For example, a first DMRS port mapping table may be utilized when DCI having a fallback DCI format is received, while a second DMRS port mapping table may be utilized when DCI having a non-fallback DCI format is received. The DMRS configuration circuitry 841 may further be configured to execute DMRS configuration software 851 included on the computer-readable medium 806 to implement one or more of the functions described herein.

The processor 804 may further include uplink (UL) traffic and control channel generation and transmission circuitry 842, configured to generate and transmit uplink control/feedback/acknowledgement information on an UL control channel. For example, the UL traffic and control channel generation and transmission circuitry 842 may be configured to generate and transmit uplink traffic on an UL traffic channel (PUSCH) in accordance with an uplink grant. In addition, the UL traffic and control channel generation and transmission circuitry 842 may be configured to generate and transmit uplink control information, such as an ACK/NACK, scheduling request, DMRS or uplink sounding reference signal on an UL control channel (e.g., PUCCH). For example, the UL traffic and control channel generation and transmission circuitry 842 may be configured to generate and transmit a DMRS based on the DMRS configuration 816 indicated by the received DCI, higher-layer parameters, and other semi-static and/or dynamic parameters related to the DMRS configuration, as described herein. The UL traffic and control channel generation and transmission circuitry 842 may further be configured to execute UL traffic and control channel generation and transmission software 852 included on the computer-readable medium to implement one or more of the functions described herein.

The processor 804 may further include downlink (DL) traffic and control channel reception and processing circuitry 843, configured for receiving and processing downlink traffic on a traffic channel, and to receive and process control information on one or more downlink control channels. For example, the DL traffic and control channel reception and processing circuitry 843 may be configured to receive DCI and/or higher-layer parameters related to scheduling of a DMRS. In addition, the DL traffic and control channel reception and processing circuitry 843 may be configured to receive a DMRS based on the DMRS configuration 816 indicated by the received DCI, higher-layer parameters, and other semi-static and/or dynamic parameters related to the DMRS configuration, as described herein. In some examples, the DL traffic and control channel reception and processing circuitry 843 may be configured to determine the semi-static and/or dynamic parameters based on received signaling and/or control information. The DL traffic and control channel reception and processing circuitry 843 may further be configured to execute DL traffic and control channel reception and processing software 853 included on the computer-readable medium 806 to implement one or more of the functions described herein.

Figure 9:
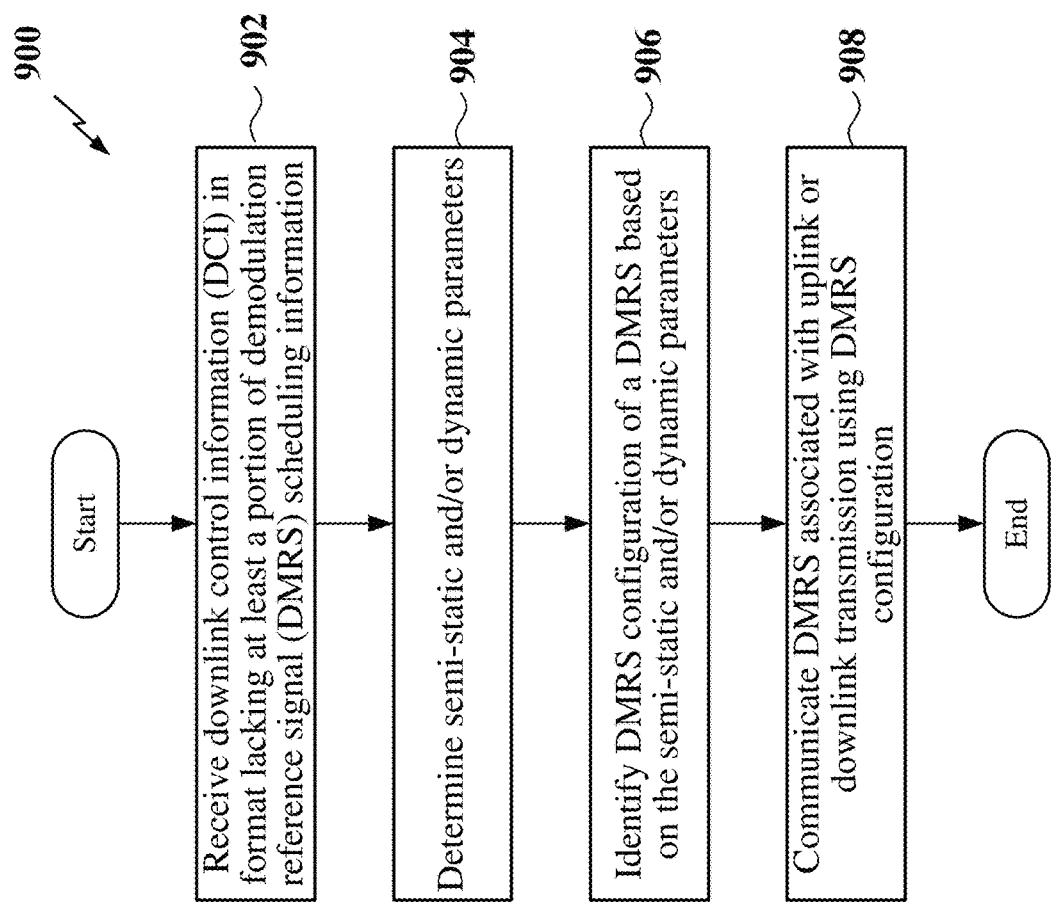
FIG. 9 is a flow chart illustrating an exemplary process for configuring a DMRS according to some aspects of the disclosure.

FIG. 9 is a flow chart illustrating an exemplary process 900 for configuring a DMRS in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 800 illustrated in FIG. 8. In some examples, the process 900 may be carried out by any suitable apparatus or means for carrying out the functions or algorithm described below.

At block 902, the scheduled entity may receive downlink control information (DCI) in a format lacking demodulation reference signal (DMRS) scheduling information. In some examples, the DCI format may be a fallback (default) DCI format, such as DCI Format 0_0 or DCI Format 1_0. In some examples, the DCI may further include scheduling information providing a downlink assignment or uplink grant of resources for a PDSCH or PUSCH transmission. For example, the DL traffic and control channel reception and processing circuitry 843 together with the transceiver 810 shown and described above in connection with FIG. 8 may receive the DCI.

At block 904, the scheduled entity may determine one or more parameters, including one or more semi-static parameters and/or one or more dynamic parameters. The one or more parameters may be determined, for example, based on information contained in RRC signaling or control information contained within a frame, subframe and/or slot. In some examples, the parameters may include system parameters (e.g., cell identifier (Cell-ID), C-RNTI, DMRS scrambling identifier, etc.) and/or time parameters (e.g., subframe number (SFN), slot index within which the DMRS and/or PDSCH/PUSCH is scheduled, etc.). For example, the DL traffic and control channel reception and processing circuitry 843 and/or the DMRS configuration circuitry 841 shown and described above in connection with FIG. 8 may determine the one or more parameters.

At block 906, the scheduled entity may identify a DMRS configuration of a DMRS to be communicated between the scheduled entity and the scheduling entity. The DMRS configuration may include, for example, at least antenna port information and DMRS sequence initialization information that may be identified based on the one or more semi-static parameters and/or dynamic parameters. In some examples, the antenna port information and DMRS sequence initialization information may be identified from RRC signaling. In other examples, the antenna port information and DMRS sequence initialization information may be identified based on one or more system parameters and/or time parameters. For example, the DMRS configuration circuitry 841 shown and described above in connection with FIG. 8 may identify the DMRS configuration.

At block 908, the scheduled entity may communicate the DMRS associated with an uplink transmission or a downlink transmission between the scheduled entity and the scheduling entity using the DMRS configuration. For example, the DL traffic and control channel reception and processing circuitry 843 and/or UL traffic and control channel generation and transmission circuitry 842 together with the transceiver 810 shown and described above in connection with FIG. 8 may communicate the DMRS with the scheduling entity.

Figure 10:
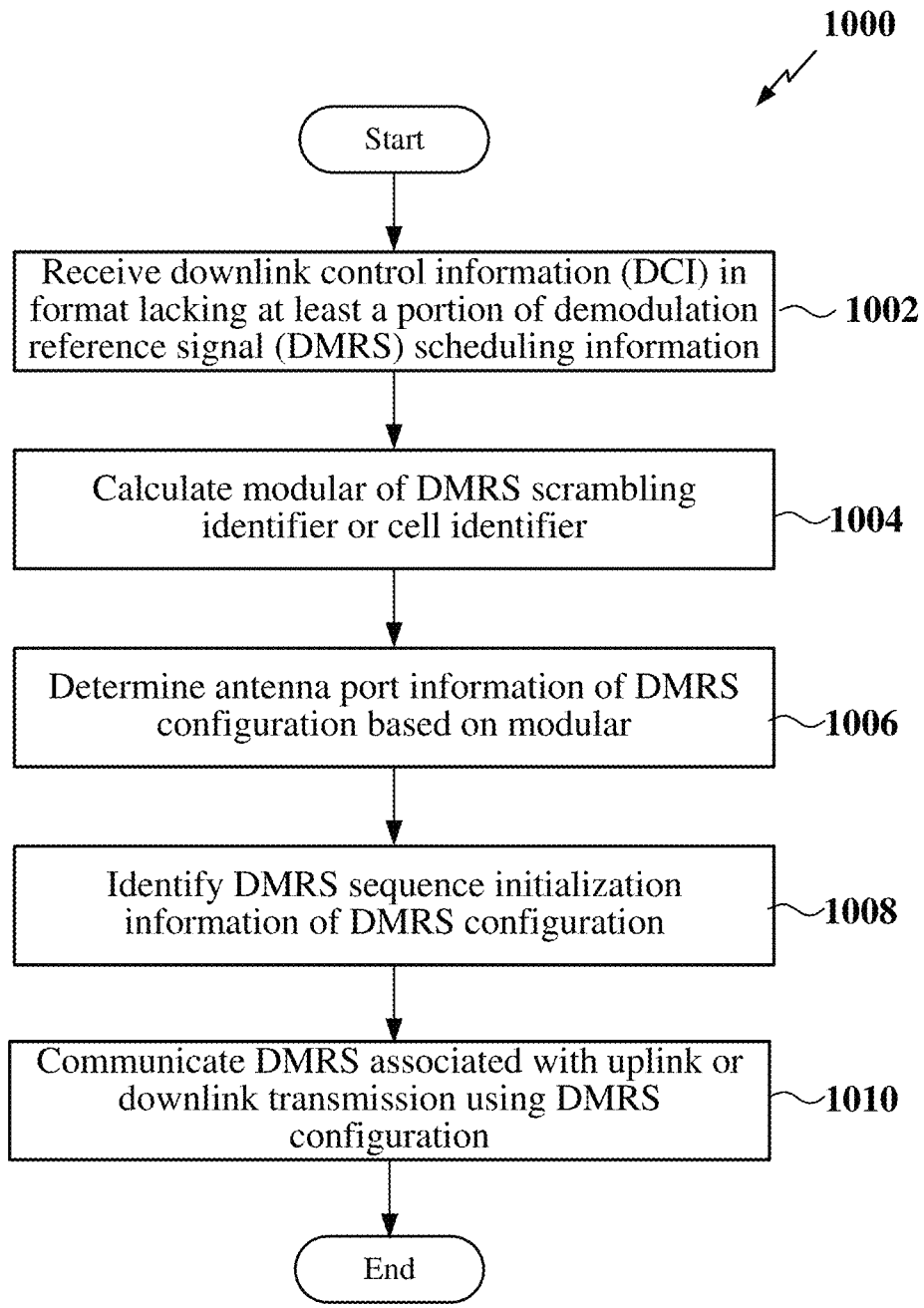
FIG. 10 is a flow chart illustrating another exemplary process for configuring a DMRS according to some aspects of the disclosure.

FIG. 10 is a flow chart illustrating an exemplary process 1000 for configuring a DMRS in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 800 illustrated in FIG. 8. In some examples, the process 1000 may be carried out by any suitable apparatus or means for carrying out the functions or algorithm described below.

At block 1002, the scheduled entity may receive downlink control information (DCI) in a format lacking demodulation reference signal (DMRS) scheduling information. In some examples, the DCI format may be a fallback (default) DCI format, such as DCI Format 0_0 or DCI Format 1_0. In some examples, the DCI may further include scheduling information providing a downlink assignment or uplink grant of resources for a PDSCH or PUSCH transmission. For example, the DL traffic and control channel reception and processing circuitry 843 together with the transceiver 810 shown and described above in connection with FIG. 8 may receive the DCI.

At block 1004, the scheduled entity may calculate a modular of the DMRS scrambling identifier or cell identifier. For example, the antenna port information may be calculated as: $N_{ID}^{nSCID} \bmod X$ where $N_{ID}^{nSCID} \in \{0, 1, \ldots, 65535\}$ is the higher-layer DMRS scrambling identifier (or the cell identifier) and X depends on the DMRS configuration (e.g., DMRS configuration type and/or DMRS maximum length). In some examples, X is sixteen, thirty-two, or sixty-four, depending on the number of rows in the DMRS port mapping table utilized by the UE (scheduled entity) and base station (scheduling entity).

At block 1006, the scheduled entity may determine the antenna port information of a DMRS configuration of a DMRS to be communicated between the scheduled entity and the scheduling entity based on the modular of the DMRS scrambling identifier or cell identifier. The antenna port information may indicate DMRS port mapping for the DMRS. In some examples, the antenna port information may designate a particular row within a DMRS port mapping table to utilize for the DMRS. Each row in the DMRS port mapping table, for example, may define the number of DMRS ports to use for the DMRS. The selected row of the DMRS port mapping table, along with the DMRS configuration type (as indicated by higher-layer signaling), may be utilized to discern the mapping between antenna ports and resource elements (REs) for the DMRS. For example, the DMRS configuration circuitry 841 shown and described above in connection with FIG. 8 may determine the antenna port information.

At block 1008, the scheduled entity may identify DMRS sequence initialization information of the DMRS configuration. The DMRS sequence initialization information indicates the index of the DMRS scrambling identifier for DMRS sequence generation. In some examples, the DMRS sequence initialization information may be identified based on one or more semi-static parameters and/or dynamic parameters. In some examples, the DMRS sequence initialization information may be identified from RRC signaling. In other examples, the DMRS sequence initialization information may be identified based on one or more system parameters (e.g., cell identifier (Cell-ID), C-RNTI, DMRS scrambling identifier, etc.) and/or time parameters (e.g., subframe number (SFN), slot index within which the DMRS and/or PDSCH/PUSCH is scheduled, etc.). For example, the DMRS configuration circuitry 841 shown and described above in connection with FIG. 8 may identify the DMRS sequence initialization information of the DMRS configuration.

At block 1010, the scheduled entity may communicate the DMRS associated with an uplink transmission or a downlink transmission between the scheduled entity and the scheduling entity using the DMRS configuration. For example, the DL traffic and control channel reception and processing circuitry 843 and/or UL traffic and control channel generation and transmission circuitry 842 together with the transceiver 810 shown and described above in connection with FIG. 8 may communicate the DMRS with the scheduling entity.

Figure 11:
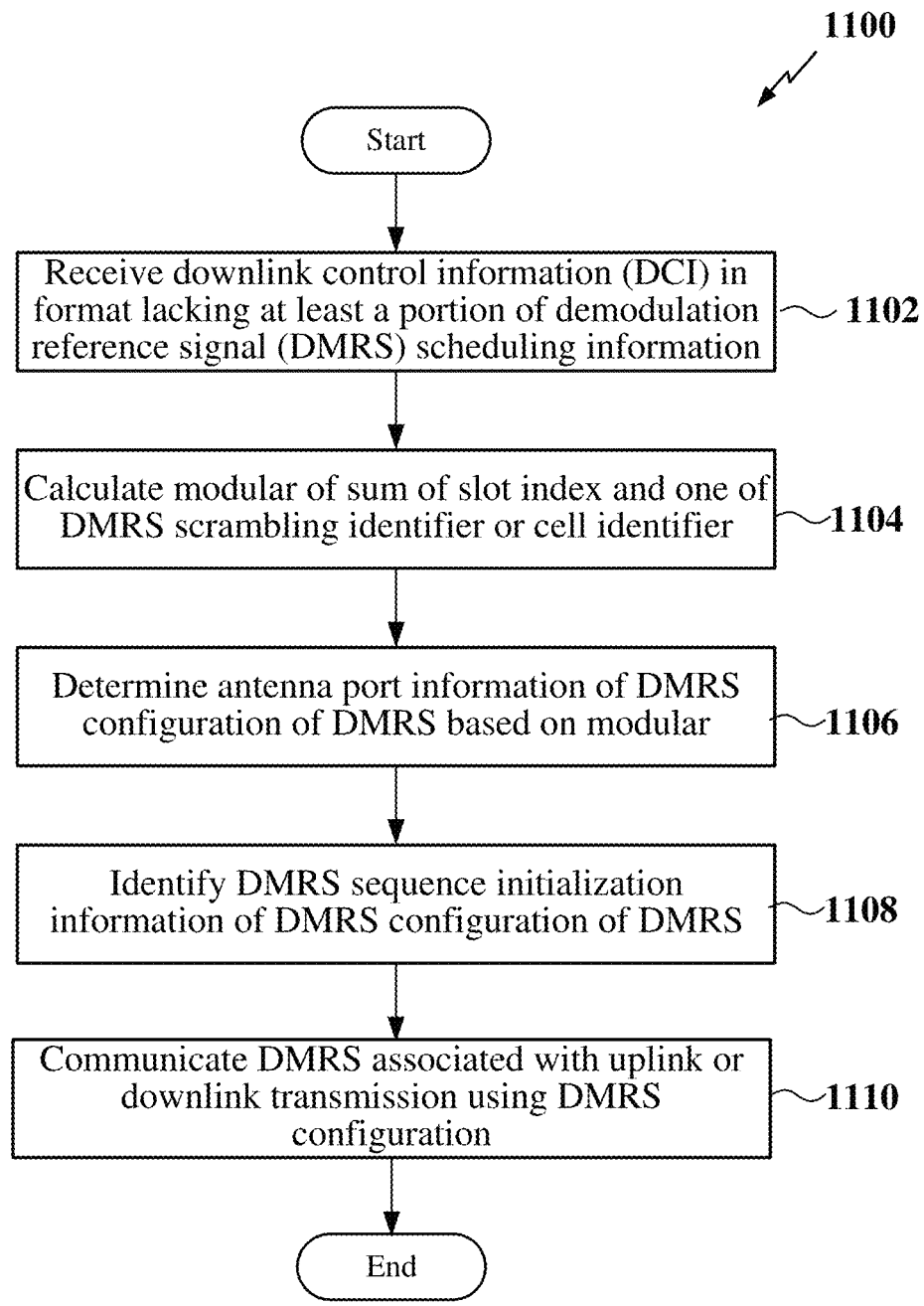
FIG. 11 is a flow chart illustrating another exemplary process for configuring a DMRS according to some aspects of the disclosure.

FIG. 11 is a flow chart illustrating an exemplary process 1100 for configuring a DMRS in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 800 illustrated in FIG. 8. In some examples, the process 1100 may be carried out by any suitable apparatus or means for carrying out the functions or algorithm described below.

At block 1102, the scheduled entity may receive downlink control information (DCI) in a format lacking demodulation reference signal (DMRS) scheduling information. In some examples, the DCI format may be a fallback (default) DCI format, such as DCI Format 0_0 or DCI Format 1_0. In some examples, the DCI may further include scheduling information providing a downlink assignment or uplink grant of resources for a PDSCH or PUSCH transmission. For example, the DL traffic and control channel reception and processing circuitry 843 together with the transceiver 810 shown and described above in connection with FIG. 8 may receive the DCI.

At block 1104, the scheduled entity may calculate a modular of a sum of a slot index (slot number in the radio frame within which the DMRS is transmitted) and the DMRS scrambling identifier or cell identifier. For example, the antenna port information may be calculated as: $(N_{ID}^{n\_SCID} + n_s) \mod X$, where $n_s$ is the slot index and X depends on the DMRS configuration (e.g., DMRS configuration type and/or DMRS maximum length). In some examples, X is sixteen, thirty-two, or sixty-four, depending on the number of rows in the DMRS port mapping table utilized by the UE (scheduled entity) and base station (scheduling entity).

At block 1106, the scheduled entity may determine the antenna port information of a DMRS configuration of a DMRS to be communicated between the scheduled entity and the scheduling entity based on the modular calculated at block 1104. The antenna port information may indicate DMRS port mapping for the DMRS. In some examples, the antenna port information may designate a particular row within a DMRS port mapping table to utilize for the DMRS. Each row in the DMRS port mapping table, for example, may define the number of DMRS ports to use for the DMRS. The selected row of the DMRS port mapping table, along with the DMRS configuration type (as indicated by higher-layer signaling), may be utilized to discern the mapping between antenna ports and resource elements (REs) for the DMRS. For example, the DMRS configuration circuitry 841 shown and described above in connection with FIG. 8 may determine the antenna port information.

At block 1108, the scheduled entity may identify DMRS sequence initialization information of the DMRS configuration. The DMRS sequence initialization information indicates the index of the DMRS scrambling identifier for DMRS sequence generation. In some examples, the DMRS sequence initialization information may be identified based on one or more semi-static parameters and/or dynamic parameters. In some examples, the DMRS sequence initialization information may be identified from RRC signaling. In other examples, the DMRS sequence initialization information may be identified based on one or more system parameters (e.g., cell identifier (Cell-ID), C-RNTI, DMRS scrambling identifier, etc.) and/or time parameters (e.g., subframe number (SFN), slot index within which the PDSCH/PUSCH is scheduled, etc.). For example, the DMRS configuration circuitry 841 shown and described above in connection with FIG. 8 may identify the DMRS sequence initialization information of the DMRS configuration.

At block 1110, the scheduled entity may communicate the DMRS associated with an uplink transmission or a downlink transmission between the scheduled entity and the scheduling entity using the DMRS configuration. For example, the DL traffic and control channel reception and processing circuitry 843 and/or UL traffic and control channel generation and transmission circuitry 842 together with the transceiver 810 shown and described above in connection with FIG. 8 may communicate the DMRS with the scheduling entity.

Figure 12:
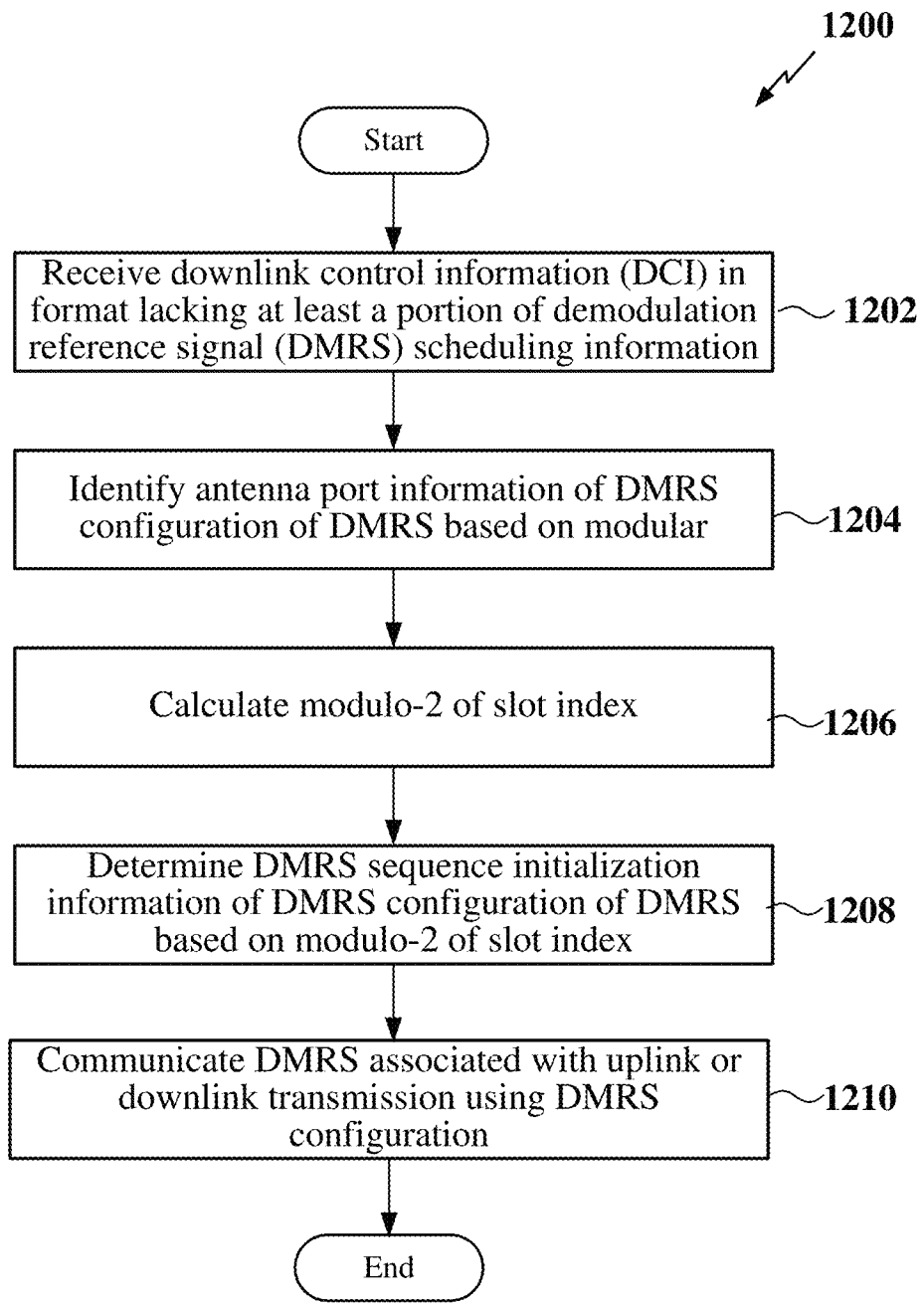
FIG. 12 is a flow chart illustrating another exemplary process for configuring a DMRS according to some aspects of the disclosure.

FIG. 12 is a flow chart illustrating an exemplary process 1200 for configuring a DMRS in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 800 illustrated in FIG. 8. In some examples, the process 1200 may be carried out by any suitable apparatus or means for carrying out the functions or algorithm described below.

At block 1202, the scheduled entity may receive downlink control information (DCI) in a format lacking demodulation reference signal (DMRS) scheduling information. In some examples, the DCI format may be a fallback (default) DCI format, such as DCI Format 0_0 or DCI Format 1_0. In some examples, the DCI may further include scheduling information providing a downlink assignment or uplink grant of resources for a PDSCH or PUSCH transmission. For example, the DL traffic and control channel reception and processing circuitry 843 together with the transceiver 810 shown and described above in connection with FIG. 8 may receive the DCI.

At block 1204, the scheduled entity may identify antenna port information of a DMRS configuration of a DMRS to be communicated between the scheduled entity and the scheduling entity. The antenna port information may indicate DMRS port mapping for the DMRS. In some examples, the antenna port information may designate a particular row within a DMRS port mapping table to utilize for the DMRS. Each row in the DMRS port mapping table, for example, may define the number of DMRS ports to use for the DMRS. The selected row of the DMRS port mapping table, along with the DMRS configuration type (as indicated by higher-layer signaling), may be utilized to discern the mapping between antenna ports and resource elements (REs) for the DMRS.

In some examples, the antenna port information may be identified based on one or more semi-static parameters and/or dynamic parameters. In some examples, the antenna port information may be identified from RRC signaling. In other examples, the antenna port information may be identified based on one or more system parameters (e.g., cell identifier (Cell-ID), C-RNTI, DMRS scrambling identifier, etc.) and/or time parameters (e.g., subframe number (SFN), slot index within which the DMRS and/or PDSCH/PUSCH is scheduled, etc.). For example, the DMRS configuration circuitry 841 shown and described above in connection with FIG. 8 may identify the antenna port information of the DMRS configuration.

At block 1206, the scheduled entity may calculate a modulo-2 of a slot index (slot number in the radio frame within which the DMRS is transmitted). For example, the scheduled entity may calculate: $n_{SCID} = n_s \bmod 2$. For example, the DMRS configuration circuitry 841 shown and described above in connection with FIG. 8 may calculate the modulo-2 of the slot index.

At block 1208, the scheduled entity may determine DMRS sequence initialization information of the DMRS configuration based on the modulo-2 of the slot index. The DMRS sequence initialization information indicates the index of the DMRS scrambling identifier for DMRS sequence generation. For example, the DMRS configuration circuitry 841 shown and described above in connection with FIG. 8 may determine the DMRS sequence initialization information of the DMRS configuration.

At block 1210, the scheduled entity may communicate the DMRS associated with an uplink transmission or a downlink transmission between the scheduled entity and the scheduling entity using the DMRS configuration. For example, the DL traffic and control channel reception and processing circuitry 843 and/or UL traffic and control channel generation and transmission circuitry 842 together with the transceiver 810 shown and described above in connection with FIG. 8 may communicate the DMRS with the scheduling entity.

Figure 13:
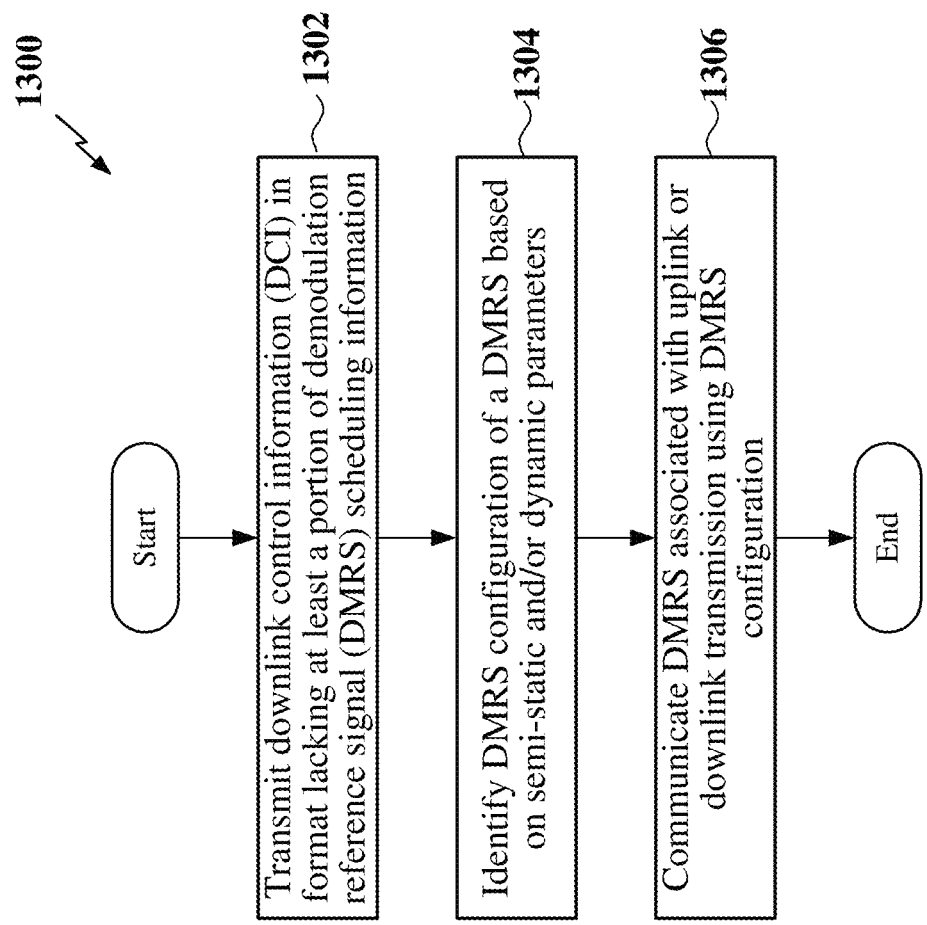
FIG. 13 is a flow chart illustrating another exemplary process for configuring a DMRS according to some aspects of the disclosure.

FIG. 13 is a flow chart illustrating an exemplary process 1300 for configuring a DMRS in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 700 illustrated in FIG. 7. In some examples, the process 1300 may be carried out by any suitable apparatus or means for carrying out the functions or algorithm described below.

At block 1302, the scheduling entity may generate and transmit downlink control information (DCI) for a demodulation reference signal (DMRS) in a format lacking DMRS scheduling information. In some examples, the DCI format may be a fallback (default) DCI format, such as DCI Format 0_0 or DCI Format 1_0. In some examples, the DCI may further include scheduling information providing a downlink assignment or uplink grant of resources for a PDSCH or PUSCH transmission. For example, the resource assignment and scheduling circuitry 742 and DL traffic and control channel generation and transmission circuitry 743 together with the transceiver 710 shown and described above in connection with FIG. 7 may generate and transmit the DCI.

At block 1304, the scheduling entity may identify a DMRS configuration of a DMRS to be communicated between the scheduling entity and the scheduled entity. The DMRS configuration may include, for example, at least antenna port information and DMRS sequence initialization information that may be identified based on one or more semi-static parameters and/or dynamic parameters. In some examples, the antenna port information and DMRS sequence initialization information may be identified by the scheduling entity and communicated to the scheduled entity via RRC signaling. In other examples, the antenna port information and DMRS sequence initialization information may be identified by both the scheduling entity and the scheduled entity based on one or more system parameters (e.g., cell identifier (Cell-ID), C-RNTI, DMRS scrambling identifier, etc.) and/or time parameters (e.g., subframe number (SFN), slot index within which the DMRS and/or PDSCH/PUSCH is scheduled, etc.). For example, the DMRS configuration circuitry 741 shown and described above in connection with FIG. 7 may identify the DMRS configuration.

At block 1306, the scheduling entity may communicate the DMRS associated with an uplink transmission or a downlink transmission between the scheduling entity and the scheduled entity using the DMRS configuration. For example, the DL traffic and control channel generation and transmission circuitry 743 and/or UL traffic and control channel reception and processing circuitry 744 together with the transceiver 710 shown and described above in connection with FIG. 7 may communicate the DMRS with the scheduling entity.

In one configuration, a scheduled entity apparatus in a wireless communication network includes means for receiving downlink control information (DCI) including a DCI format, in which the DCI format includes scheduling information that lacks at least a portion of demodulation reference signal (DMRS) scheduling information for a DMRS, means for determining one or more parameters including at least one of semi-static parameters or dynamic parameters, means for identifying a DMRS configuration of the DMRS, where the DMRS configuration includes at least antenna port information and DMRS sequence initialization information identified based on the one or more parameters, and means for communicating the DMRS associated with an uplink transmission or a downlink transmission between the scheduled entity apparatus and the scheduling entity using the DMRS configuration.

In one aspect, the aforementioned means for receiving DCI, the means for determining the one or more parameters, the means for identifying the DMRS configuration of the DMRS, and the means for communicating the DMRS may be the processor(s) 804 shown in FIG. 8 configured to perform the functions recited by the aforementioned means. For example, the aforementioned means for receiving the DCI may include the DL traffic and control channel reception and processing circuitry 843, together with the transceiver 810, shown in FIG. 8. As another example, the means for determining the one or more parameters may include the DL traffic and control channel reception and processing circuitry 843 and/or the DMRS configuration circuitry 841, shown in FIG. 8. As yet another example, the aforementioned means for identifying the DMRS configuration of the DMRS may include the DMRS configuration circuitry 841 shown in FIG. 8. As yet another example, the aforementioned means for communicating the DMRS may include the DL traffic and control channel reception and processing circuitry 843 and/or the UL traffic and control channel generation and transmission circuitry 842, together with the transceiver 810, shown in FIG. 8. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 7, and 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network for a scheduled entity to communicate with a scheduling entity, the method comprising:
   receiving downlink control information (DCI) comprising a DCI format, the DCI format comprising scheduling information that lacks at least a portion of demodulation reference signal (DMRS) scheduling information for a DMRS;
   determining one or more parameters, wherein the one or more parameters comprise at least one of semi-static parameters or dynamic parameters;
   identifying a DMRS configuration of the DMRS, wherein the DMRS configuration comprises at least antenna port information and DMRS sequence initialization information identified based on the one or more parameters, wherein identifying the DMRS configuration of the DMRS further comprises:
      calculating a modular of a DMRS scrambling identifier or a cell identifier to determine the antenna port information, wherein the modular is selected based on at least one of a DMRS configuration type or a DMRS maximum length; and
   communicating the DMRS associated with an uplink transmission or a downlink transmission between the scheduled entity and the scheduling entity using the DMRS configuration.

2. The method of claim 1, wherein the one or more parameters comprise at least one of system parameters or time parameters.

3. The method of claim 2, wherein the one or more parameters comprise the system parameters, the system parameters comprising at least one of a cell identifier, a cell radio network temporary identifier, or a DMRS scrambling identifier.

4. The method of claim 2, wherein the one or more parameters comprise the time parameters, the time parameters comprising at least one of a subframe number or a slot index of a slot within which the uplink transmission or the downlink transmission is scheduled.

5. The method of claim 4, wherein the scheduling information further comprises scheduling information for the uplink transmission or the downlink transmission.

6. The method of claim 1, wherein the modular is equal to a number of rows in a DMRS port mapping table.

7. The method of claim 6, wherein the DMRS port mapping table comprises a fallback DMRS port mapping table associated with the DCI format lacking the DMRS scheduling information that is different from a non-fallback DMRS port mapping table associated with a different DCI format comprising the DMRS scheduling information.

8. The method of claim 1, wherein the DMRS sequence initialization information comprises a fixed value.

9. The method of claim 1, wherein identifying the DMRS configuration of the DMRS further comprises:
 calculating a modulo-2 of a slot index to determine the DMRS sequence initialization information.

10. The method of claim 1, wherein the modular is selected based on at least a DMRS configuration type.

11. The method of claim 1, wherein the modular is selected based on at least a DMRS maximum length.

12. The method of claim 1, wherein the modular is selected based on at least a DMRS configuration type and a DMRS maximum length.

13. A method of wireless communication in a wireless communication network for a scheduled entity to communicate with a scheduling entity, the method comprising:
 receiving downlink control information (DCI) comprising a DCI format, the DCI format comprising scheduling information that lacks at least a portion of demodulation reference signal (DMRS) scheduling information for a DMRS;
 determining one or more parameters, wherein the one or more parameters comprise at least one of semi-static parameters or dynamic parameters;
 identifying a DMRS configuration of the DMRS, wherein the DMRS configuration comprises at least antenna port information and DMRS sequence initialization information identified based on the one or more parameters, wherein identifying the DMRS configuration of the DMRS further comprises:
  calculating a modular of a summation of a slot index and one of a DMRS scrambling identifier or a cell identifier to determine the antenna port information, wherein the modular is selected based on at least one of a DMRS configuration type or a DMRS maximum length; and
 communicating the DMRS associated with an uplink transmission or a downlink transmission between the scheduled entity and the scheduling entity using the DMRS configuration.

14. The method of claim 13, wherein the modular is selected based on at least a DMRS configuration type.

15. The method of claim 13, wherein the modular is selected based on at least a DMRS maximum length.

16. The method of claim 13, wherein the modular is selected based on at least a DMRS configuration type and a DMRS maximum length.

17. A scheduled entity in a wireless communication network, comprising:
 a processor;
 a transceiver communicatively coupled to the processor and configured to wirelessly communicate with a scheduling entity; and
 a memory communicatively coupled to the processor;
 wherein the processor is configured to:
  receive downlink control information (DCI) comprising a DCI format via the transceiver, the DCI format comprising scheduling information that lacks at least a portion of demodulation reference signal (DMRS) scheduling information for a DMRS;
  determine one or more parameters, wherein the one or more parameters comprise at least one of semi-static parameters or dynamic parameters;
  identify a DMRS configuration of the DMRS, wherein the DMRS configuration comprises at least antenna port information and DMRS sequence initialization information identified based on the one or more parameters, comprising:
   calculating a modular of a DMRS scrambling identifier or a cell identifier to determine the antenna port information, wherein the modular is selected based on at least one of a DMRS configuration type or a DMRS maximum length; and
  communicating the DMRS associated with an uplink transmission or a downlink transmission between the scheduled entity and the scheduling entity using the DMRS configuration.

18. The scheduled entity of claim 17, wherein the one or more parameters comprise at least one of system parameters or time parameters.

19. The scheduled entity of claim 18, wherein the one or more parameters comprise the system parameters, the system parameters comprising at least one of a cell identifier, a cell radio network temporary identifier, or a DMRS scrambling identifier.

20. The scheduled entity of claim 18, wherein the one or more parameters comprise the time parameters, the time parameters comprising at least one of a subframe number or a slot index of a slot within which the uplink transmission or the downlink transmission is scheduled.

21. The scheduled entity of claim 20, wherein the scheduling information further comprises scheduling information for the uplink transmission or the downlink transmission.

22. The scheduled entity of claim 17, wherein the modular is equal to a number of rows in a DMRS port mapping table.

23. The scheduled entity of claim 22, wherein the DMRS port mapping table comprises a fallback DMRS port mapping table associated with the DCI format lacking the DMRS scheduling information that is different from a non-fallback DMRS port mapping table associated with a different DCI format comprising the DMRS scheduling information.

24. The scheduled entity of claim 17, wherein the processor is further configured to:
 calculate a modulo-2 of a slot index to determine the DMRS sequence initialization information.

25. The scheduled entity of claim 17, wherein the modular is selected based on at least a DMRS configuration type.

26. The scheduled entity of claim 17, wherein the modular is selected based on at least a DMRS maximum length.

27. The scheduled entity of claim 17, wherein the modular is selected based on at least a DMRS configuration type and a DMRS maximum length.

28. A scheduled entity in a wireless communication network, comprising:
- a processor;
- a transceiver communicatively coupled to the processor and configured to wirelessly communicate with a scheduling entity; and
- a memory communicatively coupled to the processor;
- wherein the processor is configured to:
  - receive downlink control information (DCI) comprising a DCI format via the transceiver, the DCI format comprising scheduling information that lacks at least a portion of demodulation reference signal (DMRS) scheduling information for a DMRS;
  - determine one or more parameters, wherein the one or more parameters comprise at least one of semi-static parameters or dynamic parameters;
  - identify a DMRS configuration of the DMRS, wherein the DMRS configuration comprises at least antenna port information and DMRS sequence initialization information identified based on the one or more parameters, comprising:
    - calculating a modular of a summation of a slot index and one of a DMRS scrambling identifier or a cell identifier to determine the antenna port information, wherein the modular is selected based on at least one of a DMRS configuration type or a DMRS maximum length; and
  - communicating the DMRS associated with an uplink transmission or a downlink transmission between the scheduled entity and the scheduling entity using the DMRS configuration.

29. The scheduled entity of claim 28, wherein the modular is selected based on at least a DMRS configuration type.

30. The scheduled entity of claim 28, wherein the modular is selected based on at least a DMRS maximum length.

31. The scheduled entity of claim 28, wherein the modular is selected based on at least a DMRS configuration type and a DMRS maximum length.

* * * * *